(12) United States Patent
Buckland et al.

(10) Patent No.: US 6,850,831 B2
(45) Date of Patent: Feb. 1, 2005

(54) METHOD AND SYSTEM FOR ESTIMATING CYLINDER CHARGE FOR INTERNAL COMBUSTION ENGINES HAVING VARIABLE VALVE TIMING

(75) Inventors: Julia Helen Buckland, Dearborn, MI (US); Ilya V. Kolmanovsky, Ypsilanti, MI (US); Jing Sun, Bloomfield, MI (US); Joseph Scillieri, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 10/289,591

(22) Filed: Nov. 7, 2002

(65) Prior Publication Data

US 2004/0093148 A1 May 13, 2004

(51) Int. Cl.$^7$ ............................ G06G 7/70; F02M 25/07; G01M 19/00
(52) U.S. Cl. ...................... 701/102; 73/118.1; 701/115; 123/568.14
(58) Field of Search ................................. 701/101, 102, 701/103, 104, 106, 108, 115; 123/90.11, 90.12, 90.15, 90.16, 90.17, 90.18, 568.14, 399; 73/117.3, 118.1, 118.2

(56) References Cited

U.S. PATENT DOCUMENTS

| | | | |
|---|---|---|---|
| 5,357,932 A | | 10/1994 | Clinton |
| 5,590,632 A | | 1/1997 | Kato et al. |
| 5,635,634 A | | 6/1997 | Reuschenbach |
| 6,115,664 A | * | 9/2000 | Cullen et al. ............... 701/102 |
| 6,196,197 B1 | | 3/2001 | Yamada |
| 6,311,679 B1 | | 11/2001 | Druzhinina et al. |
| 6,321,156 B1 | | 11/2001 | Kraemer |
| 6,321,157 B1 | * | 11/2001 | Sun et al. .................... 701/103 |
| 6,321,732 B1 | * | 11/2001 | Kotwicki et al. .......... 73/117.3 |
| 6,467,442 B2 | * | 10/2002 | Russell et al. ............ 123/90.15 |
| 6,499,449 B2 | * | 12/2002 | Michelini et al. ........ 123/90.15 |
| 6,553,964 B2 | * | 4/2003 | Arai et al. ................... 701/115 |
| 2001/0042529 A1 | * | 11/2001 | Kawasaki et al. ........ 123/90.15 |
| 2002/0078924 A1 | | 6/2002 | Yagi |
| 2003/0093212 A1 | * | 5/2003 | Kotwicki et al. ........... 701/102 |

OTHER PUBLICATIONS

SAE 2001–01–0581, "Air Charge Estimation in Camless Engines", van Nieuwstadt et al., Detroit, MI, Mar. 5–8, 2001.

\* cited by examiner

Primary Examiner—Willis R. Wolfe (57) ABSTRACT

A method for determining cylinder air charge and/or cylinder burned gas for an internal combustion engine system. The engine system includes cylinders, each one of such cylinders having at least one intake valve and at least one exhaust valve in communication with such cylinder. The method determines one of a plurality of different scenarios, each one of the scenarios representing a geometrical relationship between opening and closing of the intake valve relative to closing of the exhaust valve. The cylinder air charge and/or cylinder burned gas is calculated in accordance with the determined one of the plurality of scenarios. In one embodiment, the engine system stores a plurality of different software modules. The method selects one of the plurality of software modules in accordance with the determined one of the plurality of scenarios. The cylinder air charge and/or cylinder burned gas calculation comprises executing the selected one of the modules. In one embodiment, a memory stores a relationship between volume occupied by residual gas in the at least one cylinders at a predetermined position of the at least one cylinder in the engine during the cycle determined in accordance with each one of the plurality of scenarios for each of a plurality of different intake valve opening and exhaust valve closing conditions. The method includes: determining from the memory the volume occupied by residual gas in the at least one cylinders at a predetermined position of the at least one cylinder in the engine during the cycle for the intake valve opening and exhaust valve closing conditions; and, determining from volume occupied by residual gas in the at least one cylinders at a predetermined position of the at least one cylinder in the engine during the cycle the cylinder air charge and/or cylinder burned gas.

4 Claims, 8 Drawing Sheets

TABLE

| IVO \ EVC | TDC-x | TDC | TDC+x | TDC+2x | TDC+3x |
|---|---|---|---|---|---|
| TDC-3x | Vr,i determined according to Scenario 1 | Vr,i determined according to Scenario 1 | Vr,i determined according to Scenario 2 | Vr,i determined according to Scenario 2 | Vr,i determined according to Scenario 2 |
| TDC-2x | Vr,i determined according to Scenario 1 | Vr,i determined according to Scenario 1 | Vr,i determined according to Scenario 2 | Vr,i determined according to Scenario 2 | Vr,i determined according to Scenario 2 |
| TDC-x | Vr,i determined according to Scenario 1 | Vr,i determined according to Scenario 1 | Vr,i determined according to Scenario 2 | Vr,i determined according to Scenario 2 | Vr,i determined according to Scenario 2 |
| TDC | Vr,i determined according to Scenario 4 | Vr,i determined according to Scenario 4 | Vr,i determined according to Scenario 3 | Vr,i determined according to Scenario 2 | Vr,i determined according to Scenario 2 |
| TDC+x | Vr,i determined according to Scenario 4 | Vr,i determined according to Scenario 4 | Vr,i determined according to Scenario 4 | Vr,i determined according to Scenario 3 | Vr,i determined according to Scenario 3 |
| TDC+2x | Vr,i determined according to Scenario 4 | Vr,i determined according to Scenario 4 | Vr,i determined according to Scenario 4 | Vr,i determined according to Scenario 4 | Vr,i determined according to Scenario 3 |
| TDC+3x | Vr,i determined according to Scenario 4 | Vr,i determined according to Scenario 4 | Vr,i determined according to Scenario 4 | Vr,i determined according to Scenario 4 | Vr,i determined according to Scenario 3 |

Scenario 1:
IVO≤EVC, EVC≤TDC

FIG. 4A

Scenario 2:
IVO≤EVC, EVC>TDC, IVO≤TDC

FIG. 4B

Scenario 3:
IVO≤EVC, EVC>TDC, IVO>TDC

FIG. 4C

Scenario 4:
IVO>EVC

METHOD AND SYSTEM FOR ESTIMATING CYLINDER CHARGE FOR INTERNAL COMBUSTION ENGINES HAVING VARIABLE VALVE TIMING

TECHNICAL FIELD

This invention relates to methods and systems for estimating cylinder charge for internal combustion engines, and more particularly to methods and systems for estimating cylinder charge for internal combustion engines having variable valve timing (VVT).

BACKGROUND

As is known in the art, internal combustion engines with variable valve timing (VVT) are being introduced into the market place in an effort to improve fuel economy and emissions. As is also known in the art, engine controllers typically require an estimate of cylinder charge. Estimated cylinder charge is, however, significantly affected by valve timing. Furthermore, some such engines are equipped with cam profile switching (CPS), which depending on the various valve profiles, may also affect charge. The result is a significantly more complex charge estimation problem, as compared to conventional engine systems.

SUMMARY

In accordance with the invention, a method is provided for determining at least one of cylinder air charge and cylinder burned gas for an internal combustion engine system. The engine system includes cylinders, each one of such cylinders having at least one intake valve and at least one exhaust valve in communication with such cylinder. The method determines one of a plurality of different scenarios, each one of the scenarios representing a geometrical relationship between opening and closing of the intake valve relative to closing of the exhaust valve. The at least one of the cylinder air charge and cylinder burned gas is calculated in accordance with the determined one of the plurality of scenarios.

In one embodiment, the engine system includes a memory for storing a plurality of different software modules. The method selects one of the plurality of software modules in accordance with the determined one of the plurality of scenarios. The at least one of the cylinder air charge and cylinder burned gas calculation comprises executing the selected one of the modules.

In one embodiment, a table, stored in a memory, such as a read only memory (ROM), provides a relationship between volume occupied by residual gas in the at least one cylinder at a predetermined position of the at least one cylinder in the engine during the cycle determined in accordance with each one of the plurality of scenarios for each of a plurality of different intake valve opening and exhaust valve closing conditions. The method includes: determining from the memory the volume occupied by residual gas in the at least one cylinder at a predetermined position of the at least one cylinder in the engine during the cycle for the intake valve opening and exhaust valve closing conditions; and, determining from the volume occupied by residual gas in the at least one cylinder at a predetermined position of the at least one cylinder in the engine during the cycle the at least one of the cylinder air charge and cylinder burned gas.

With such method, a geometric approach to charge estimation for throttled engines equipped with VVT, including the effects of CPS is provided.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1:
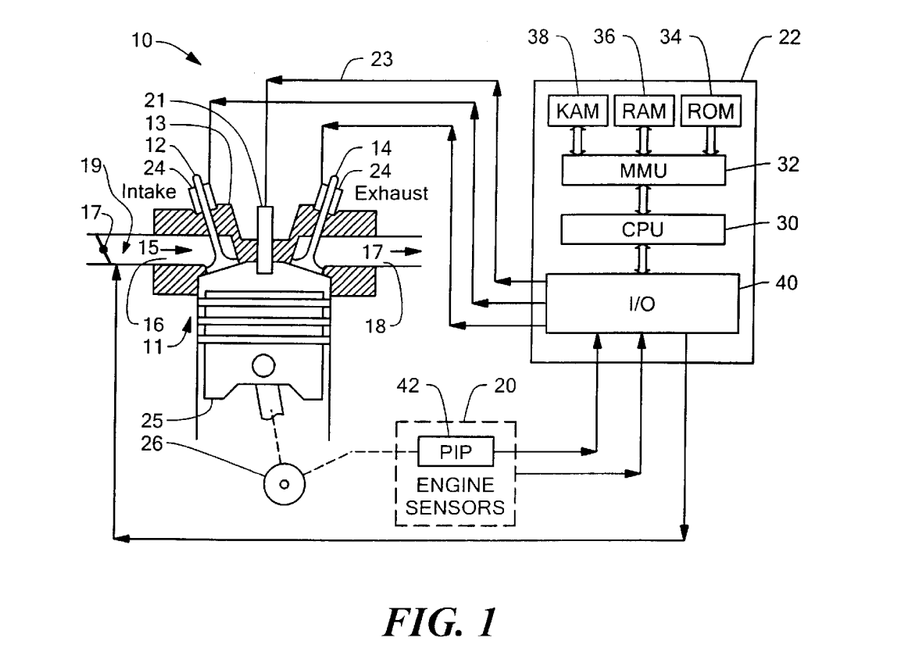
FIG. 1 is a diagram of an internal combustion engine system according to the invention.

Referring to FIG. 1, there is shown an internal combustion engine system 10. The system 10 includes one or more cylinders 11, engine sensors 20, and a controller 22, arranged as shown.

Each cylinder 11 has a cylinder head 13, which includes a spark plug 21, at least one intake valve 12 for selectively delivering an air and fuel mixture 15 to cylinder 11 from at least one intake port 16, and at least one exhaust valve 14, which selectively discharges exhaust gases 17 from the cylinder 11 through an exhaust port 18. The intake port 16 receives air after such air passes through a throttle 17 and then an intake manifold, and/or intake runner, 19. Here an electronically controlled throttle is controlled by controller 22.

System 10 also includes a conventional piston 25, which is slidably disposed within cylinder 11. While only a single cylinder 11 is shown in FIG. 1 for illustrative purposes, it should be appreciated that in the preferred embodiment, the engine comprises several cylinders 11, which may use a portion of a combined or continuous cylinder head 13.

System 10 includes the controller 22, a pair of actuators 24 which are each electrically and communicatively coupled to controller 22, and sensors 20 which are communicatively coupled to controller 22. It is should be noted that mechanical variable cam timing devices may also be used. The controller 22 has a microprocessor 30, called a central processing unit (CPU), in communication with memory management unit (MMU) 32. MMU 32 controls the movement of data among the various computer readable storage media and communicates data to and from CPU 30. The computer readable storage media preferably include volatile and nonvolatile storage in read-only memory (ROM) 34, random-access memory (RAM) 36, and keep-alive memory (KAM) 38, for example. KAM 38 may be used to store various operating variables while CPU 30 is powered down. The computer-readable storage media may be implemented using any of a number of known memory devices such as PROMs (programmable read-only memory), EPROMs (electrically PROM), EEPROMS (electrically erasable PROM), flash memory, or any other electric, magnetic, optical, or combination memory devices capable of storing data, some of which represent executable instructions, used by CPU 30 in controlling the engine or vehicle into which the engine is mounted. The computer-readable storage media may also include floppy disks, CD-ROMs, hard disks, and the like. CPU 30 communicates with various sensors 20 and actuators, including actuators 24, and spark plug 21, via an input/output (I/O) interface 40. Some controller 22 architectures do not contain MMU 32. If no MMU 32 is employed, CPU 30 manages data and connects directly to ROM 34, RAM 36, and KAM 38. Of course, the present invention could utilize more than one CPU 30 to provide engine/vehicle control and controller 22 may contain multiple ROMs 34, RAMs 36, and KAMs 38 coupled to MMU 32 or CPU 30 depending upon the particular application. Further, it is understood that with a diesel engine the spark plug 21 would not be included.

As discussed more fully and completely below, controller 40 receives signals generated by sensors 20, and processes and utilizes the received signals in accordance with a program stored in ROM 34 to determine control signals for the engine systems. As is known, determination of many of such control signals requires a determination, typically estimation, by the controller 22 of the charge into the cylinder 11; i.e., the cylinder charge being air, burned gas. The controller 22 stored in ROM 34 is a computer program executable by the CPU 30 to make such estimation. A flow diagram of such program will be described in more detail in connection with FIG. 2.

Sensors 20 comprise conventional and commercially available vehicle operating condition sensors, and may include one or more conventional engine temperature sensors, engine speed sensors, crankshaft angular position sensors, and other "fault" detection sensors, which detect faults or abnormalities in the operation of the engine. Sensors 20 are effective to measure engine operating attributes and to respectively generate and communicate signals to controller 22 representing the measured engine operating attribute. For example and without limitation, sensors 20 are effective to sense or detect the angular position of the crankshaft 26 coupled to piston 25 and to communicate a signal to controller 22 representing the measured or sensed angular position via a profile ignition pickup signal (PIP) from Hall effect sensor 42, such PIP signal being fed to the controller 22, as shown in FIG. 1.

Actuators 24 are electromechanical or electrohydraulic systems that are capable receiving signals from controller 22 and to actuate valves 12, 14 in response to the received signals. In operation, control system 22 applies an internally, preprogrammed control methodology to effect the incoming fuel and air mixture 15. To provide such function, a cylinder charge determination is made.

Figure 4:
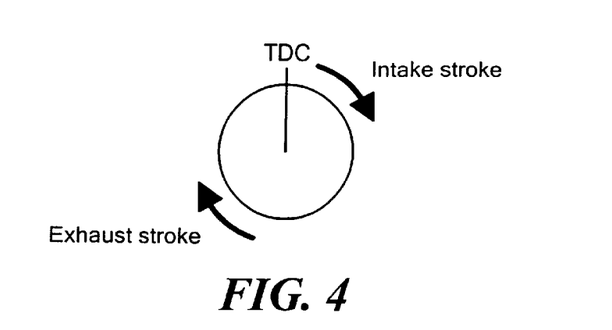
FIGS. 4, 4A–4D are diagrams showing four engine operating scenarios for the engine of FIG 1, each one of the scenarios represent a particular spatial relationship between intake and exhaust valve open/closed positions for the engine system of FIG. 1 relative to top dead center (TDC)

The determination of cylinder charge will now be described, reference also being made to "Internal Combustion Engine Fundamentals" by John B. Heywood, McGraw-Hill, Inc., 1988. It is first noted that cylinder volume at a given crank angle, not including clearance volume, may be represented as:

$$V_\theta = \frac{\pi B^2}{4}\left[l + a - \left(a \cdot \cos\theta + \sqrt{l^2 - a^2\sin^2\theta}\right)\right]$$

where:
 B is cylinder 11 bore, in meters (m);
 $a$ is crank radius (m);
 $\theta$ is crank angle, (deg); and
 l is connecting rod length (m).
Using the following definitions, referring also to FIG. 4:
TDC—Top Dead Center, i.e. the crank angle at which the piston is at its top most position in the cylinder. This position corresponds to 0° crank angle. Thus, with the four-cycle internal combustion engine 10 described herein, there the piston is at TDC twice for each power stroke: at the end of the exhaust stroke and at the end of the compression stroke. The term TDC used herein refers to the TDC which occurs at the end of the exhaust stroke.
BDC—Bottom Dead Center, i.e. the crank angle at which the piston is at its bottom most position in the cylinder. This position corresponds to 180° crank angle. As with TDC, with the four-cycle internal combustion engine 10 described herein, there are two BDC events: at the end of the intake stroke and at the end of the expansion (or power) stroke. Herein, BDC is meant to refer to the BDC at the end of the intake stroke.
ATDC—After Top Dead Center
CA—Crank Angle
IVO—Crank Angle at Intake Valve Opening (°ATDC)
IVC—Crank Angle at Intake Valve Closing (°ATDC)
EVC—Crank Angle at Exhaust Valve Closing (°ATDC)
$V_{IVO}$—Cylinder volume at IVO (m$^3$)
$V_{IVC}$—Cylinder volume at IVC (m$^3$)
$V_{EVC}$—Cylinder volume at EVC (m$^3$)
The mass of air available for combustion, $m_a$, in kg, is estimated by $$m_a = f_{air} \cdot \rho_{a,IVC} \cdot V_m$$

where:
 $f_{air}$ is the proportion of air in the air-fuel-EGR (external exhaust gas recirculation) mixture;
 $\rho_{a,IVC}$ is the density of air at IVC (kg/m$^3$) and
 $V_m$ is the volume available for the air-fuel-EGR mixture at IVC (m$^3$).
The quantity $f_{air}$ is defined as:

$$f_{air} = \frac{m_a}{m_a + m_f + m_{bg}^i} = \frac{1}{1 + \frac{1}{AFR} + F_i},$$

where:
 $m_a$ is the mass of air in cylinder;
 $m_f$ is the mass of fuel in cylinder;
 $m_{bg}^i$ is the mass of burned gas in the intake manifold resulting from external EGR;
 AFR is the air-fuel ratio, which is typically measured; and
 $F_i$ is the fraction of burned gas in the intake manifold resulting from external EGR, defined as $$\frac{m_{bg}^i}{m_a}.$$

$F_i$ can be estimated via methods available in the literature.

When fuel injection occurs after IVC, as is the case for direct injection engines operating with stratified charge, this expression becomes $$f_{air} = \frac{1}{1+F_i}.$$

The density of air at IVC may be estimated as follows.

$$\rho_{a,IVC} = \rho_{amb} \cdot \frac{T_{amb}}{T_{IVC}} \cdot \frac{P_i}{P_{amb}}$$

where:

$\rho_{amb}$ (kg/m³) is the density of air at ambient conditions;

$T_{amb}$ (K) is the ambient temperature;

$T_{IVC}$ (K) is the temperature of the gas in the cylinder at IVC;

$P_i$ (kPa) is the intake manifold pressure; and $P_{amb}$ (kPa) is the ambient pressure.

It is assumed here that the pressure in the cylinder at IVC is nearly equilibrated with the intake manifold pressure.

The volume available for the air-fuel mixture at IVC is $$V_m = (V_{IVC} + V_{cl}) - F_e^* V_{r,IVC}$$

where:

$V_{IVC}$ (m³) is the volume of the combustion chamber at IVC;

$V_{cl}$ (m³) is the clearance volume of each cylinder;

$F_e$ is the proportion of burned gas in the residual gas, which can be estimated via methods available in the literature; and $V_{r,IVC}$ (m³) is the volume of residual gas in the cylinder at IVC, where residual gas is defined as the gas in the cylinder, not introduced with external EGR, that was involved in a previous combustion event.

$$V_{r,IVC} = \frac{T_{IVC}}{T_{exh}} \cdot \frac{P_{exh}}{P_i} \cdot (V_{r,i} + V_{cl})$$

where:

$T_{exh}$ (K) is exhaust manifold temperature;

$P_{exh}$ (kPa) is the exhaust manifold pressure; and $V_{r,i}$ (m³) is the volume of residual gas at the time of last possible entry of such gas, not including the residual gas occupying the clearance volume. Thus, $V_{r,i}$ is the volume of residual gas at EVC or TDC, whichever is later. It is noted that $V_{r,i}$ is the residual gas in the at least one cylinder at a predetermined position of the at least one cylinder in the engine during each four-stroke engine the cycle.

It is assumed that the residual gas is near exhaust manifold conditions at the time the residual gas last enters the cylinder (i.e., at EVC or TDC).

The volume of residual-gas at last entry (i.e., at EVC or TDC) is determined from geometric considerations and knowledge of IVO and EVC. This volume is estimated for 4 different valve timing scenarios:

1. IVO≦EVC≦TDC. Overlap is positive and the exhaust valve is closed before or at TDC.
2. IVO≦EVC, EVC>TDC, IVO≦TDC. Overlap is positive and the exhaust valve is closed after TDC. The intake valve is opened before or at TDC.
3. IVO≦EVC, EVC>TDC, IVO>TDC. Overlap is positive and the exhaust valve is closed after TDC. The intake valve is opened after TDC.
4. IVO>EVC. Overlap is negative.

Each scenario will be discussed individually in the following subsections.

Scenario 1: IVO≦EVC≦TDC

Figure 3A:
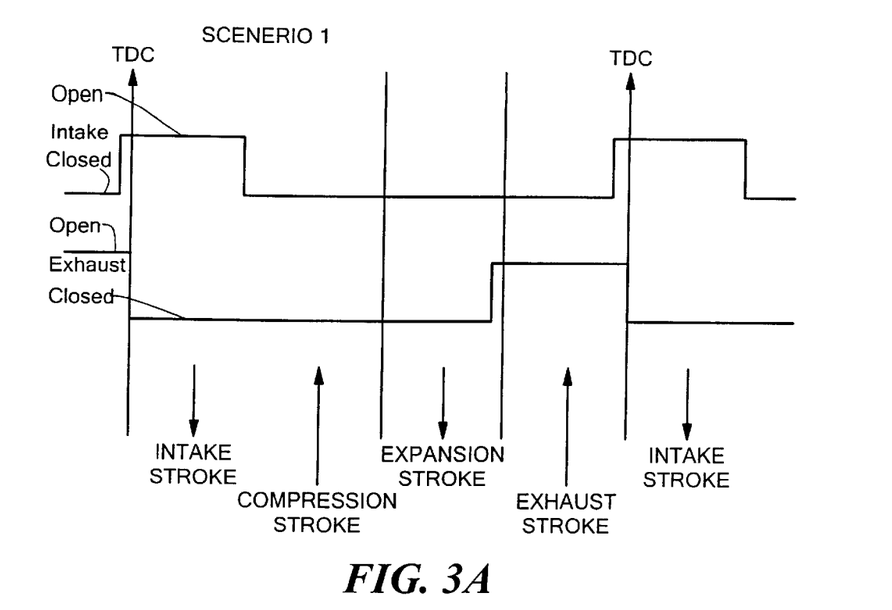
FIGS. 3A–3D are timing diagrams showing four engine scenarios, each one of the scenarios represent a particular relationship between intake and exhaust valve open/closed positions for the engine system of FIG. 1 relative to top dead center (TDC)
Figure 4A:
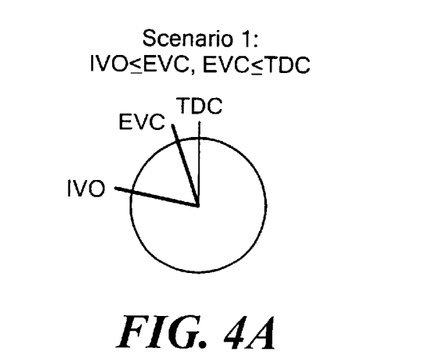

In this scenario, the intake valve opens during the exhaust stroke and before the exhaust valve closes, as shown in FIGS. 3A and 4A. During the time that both the intake and exhaust valves are open, exhaust gas is forced out of the cylinder into both the intake and exhaust manifolds. The residual gas pushed into the intake manifold will be inducted into the cylinder later in the cycle and will be a portion of the total volume of residual gas. It is assumed that the volume of residual gas pushed into the intake manifold during this overlap period is proportional to instantaneous flow area.

In this scenario, the exhaust valve closes before or at TDC. It is assumed that, during the time from EVC to TDC, all of the exhaust gas occupying the cylinder volume at EVC (excluding the clearance volume) is expelled to the intake runners. The resulting expression for the volume of residual gas is $$V_{r,i} = \int_{IVO}^{EVC} \frac{A_i(\theta)}{A_i(\theta) + A_e(\theta)} dV(\theta) + V_{EVC}$$

where:

$A_i$ (m²) is the effective intake valve area;

$A_e$ (m²) is the effective exhaust valve area; and $\theta$ (deg.) is crank angle. Thus, $$\int_{IVO}^{EVC} \frac{A_i(\theta)}{A_i(\theta) + A_e(\theta)} dV(\theta)$$

represents the volume of residual gas expelled to the intake manifold runner 19 during positive overlap, i.e., both the intake and exhaust valves are open; and $V_{EVC}$ represents the volume of residual gas expelled to the intake manifold runner after EVC.

In the absence of a valve lift profile, assume that the valves open and close instantaneously. The integral expression becomes $$\int_{IVO}^{EVC} \frac{A_i(\theta)}{A_i(\theta) + A_e(\theta)} dV(\theta) = \frac{A_i^{max}}{A_i^{max} + A_e^{max}} (V_{IVO} - V_{EVC}).$$

where $A_i^{max}$ (m²) is the maximum effective intake valve area, which can be approximated by multiplying the maximum valve lift by the valve circumference; and $A_e^{max}$ (m²) is the maximum effective exhaust valve area, which can be approximated by multiplying the maximum valve lift by the valve circumference.

This simplification is sufficient at low engine speeds. (It should be noted that in scenarios described below, the valve lift profile integrals can be approximated in a similar manner.)

Scenario 2: IVO≦EVC, EVC>TDC, IVO≦TDC

Figure 3B:
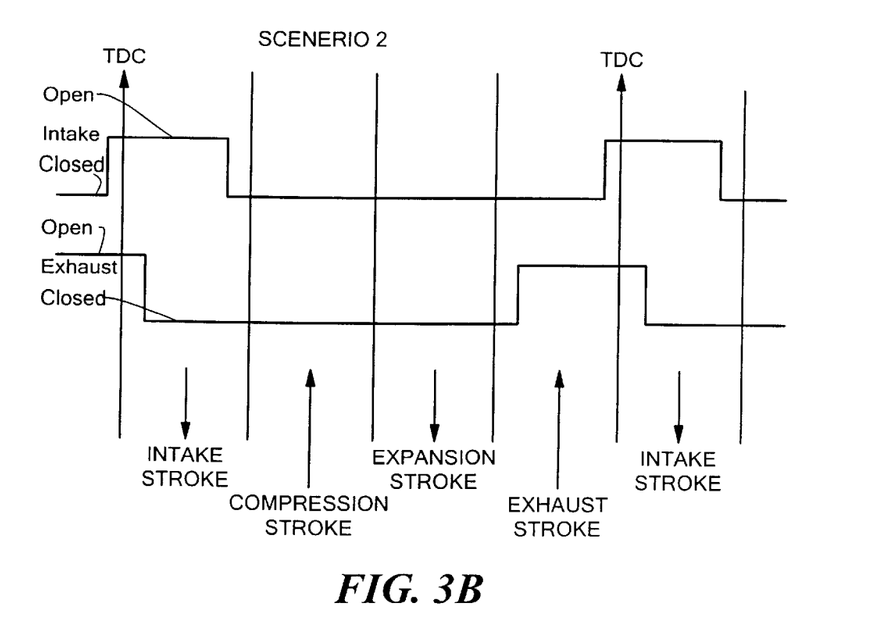
Figure 4B:
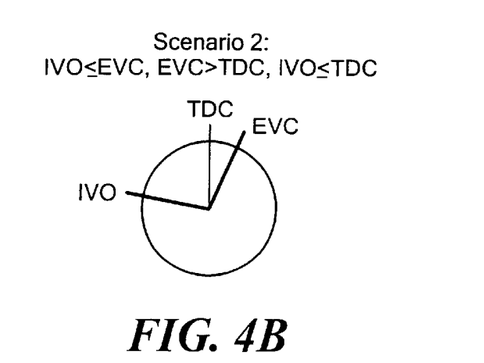

In this scenario, shown in FIGS. 3B and 4B, the intake valve opens during the exhaust stroke but the exhaust valve closes during the intake stroke, i.e. after TDC. During the time that both the intake and exhaust valves are open before TDC, exhaust gas is forced out of the cylinder into both the intake and exhaust manifolds. During the time that both the intake and exhaust valves are open after TDC, gas is pulled into the cylinder from both the intake and exhaust manifolds. It is assumed that the volume of residual gas pushed into the intake manifold or pulled in from the exhaust manifold during this overlap period is proportional to instantaneous flow area. The resulting expression for the volume of residual gas is $$V_{r,i} = \int_{IVO}^{TDC} \frac{A_i(\theta)}{A_i(\theta) + A_e(\theta)} dV(\theta) + \int_{TDC}^{EVC} \frac{A_e(\theta)}{A_i(\theta) + A_e(\theta)} dV(\theta)$$

where:

$$\int_{IVO}^{TDC} \frac{A_i(\theta)}{A_i(\theta) + A_e(\theta)} dV(\theta)$$

represents the volume of residual gas expelled to the intake manifold runner during the exhaust stroke; and $$\int_{TDC}^{EVC} \frac{A_e(\theta)}{A_i(\theta) + A_e(\theta)} dV(\theta)$$

represents the volume of residual gas pulled from the exhaust manifold runner during the intake stroke.

Scenario 3: IVO≦EVC, EVC>TDC, IVO>TDC

Figure 3C:
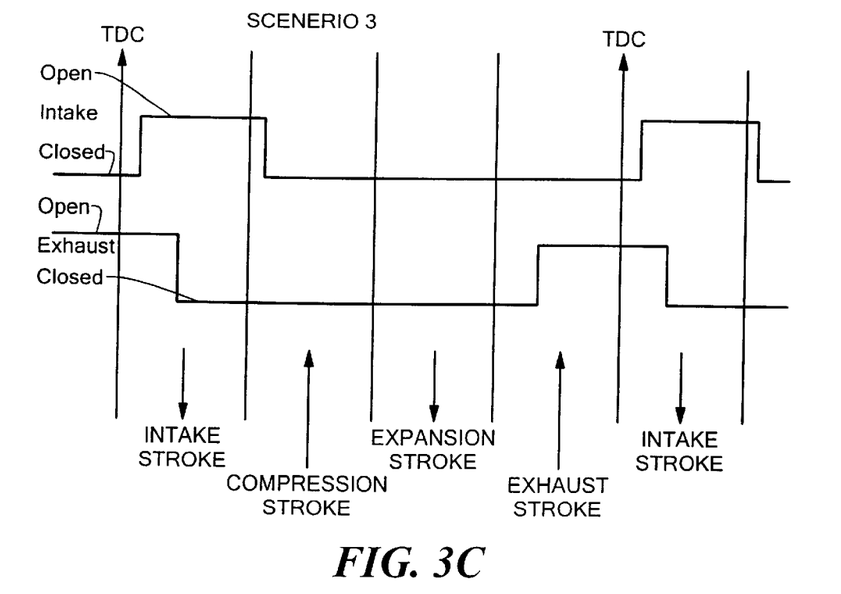
Figure 4C:
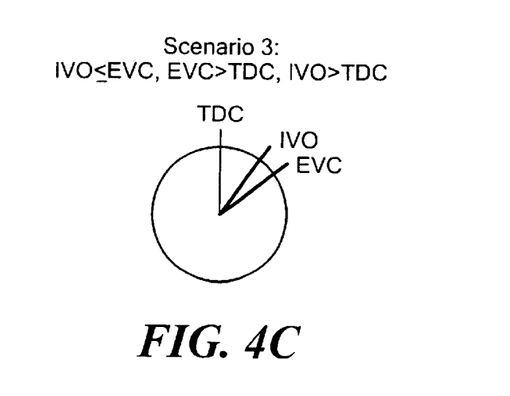

In this scenario, shown in FIGS. 3C and 4C, the intake valve opens during the intake stroke and before the exhaust valve closes. During the time that both the intake and exhaust valves are open after TDC, gas is pulled into the cylinder from both the intake and exhaust manifolds. It is assumed that the volume of residual gas pulled in from the exhaust manifold during this overlap period is proportional to instantaneous flow area.

Prior to IVO, all of the gas inducted into the cylinder is exhaust gas and the volume of residual gas in the cylinder at IVO remains in the cylinder. The resulting expression for the volume of residual gas is $$V_{r,i} = V_{IVO} + \int_{IVO}^{EVC} \frac{A_e(\theta)}{A_i(\theta) + A_e(\theta)} dV(\theta)$$

where $$V_{IVO}$$

represents the volume of residual gas in the cylinder when the intake valve opens; and $$V_{r,i} = \int_{IVO}^{EVC} \frac{A_e(\theta)}{A_i(\theta) + A_e(\theta)} dV(\theta)$$

represents the volume of residual gas pulled from the exhaust manifold runner during the intake stroke.

Scenario 4: IVO>EVC

Figure 3D:
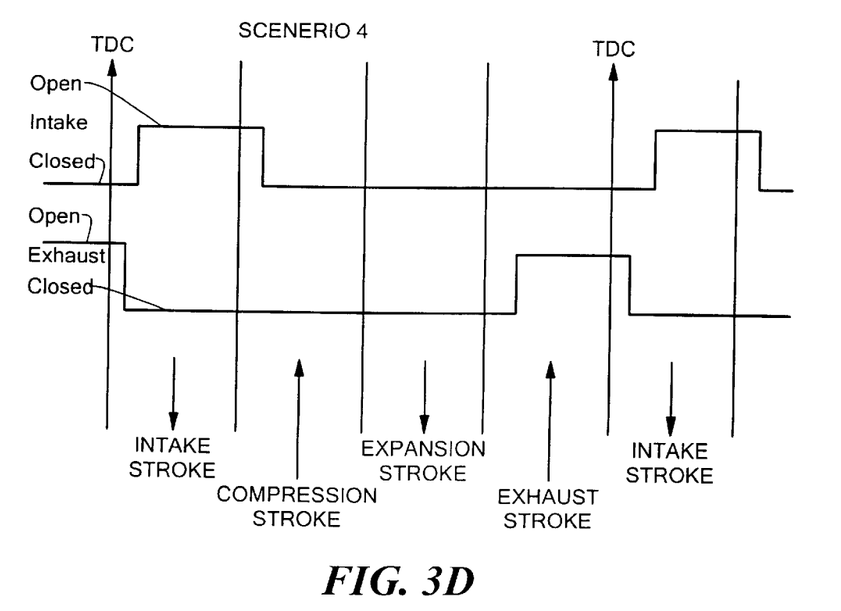
Figure 4D:
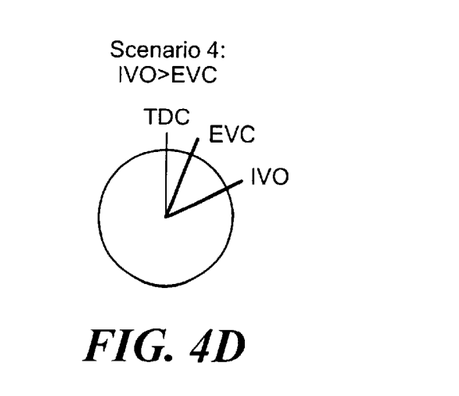

In this scenario, shown in FIGS. 3D and 4D, the intake valve opens after the exhaust valve closes, i.e., overlap is negative. The volume of residual gas is assumed equal to the cylinder volume at EVC:

$$V_{r,i} = V_{EVC}$$

which is the volume of residual gas in the cylinder when the exhaust valve closes.

Estimate of Temperature at IVC

A value for $T_{IVC}$ is required for the method as described above, but a measurement is typically not available. Some methods that may be appropriate for estimating $T_{IVC}$ are listed here.
1. Approximate as a constant, typically near 400 K.
2. Use intake runner temperature as a surrogate, such temperature being sensed by a temperature sensor, not shown, in at least one intake runner of the engine or estimated with a model developed from engine mapping data.
3. Develop a regression based model, which may take the form $$T_{IVC} = f(N, m_f, EVC-IVO)$$

where: N (rpm) is engine speed;
$m_f$ (kg/hr) is fuel flow rate; and
EVC-IVO (°CA) defines valve overlap.
These estimates differ in complexity and the best approach will vary with the system under development.

Inertial Effects

The corrections for inertial effects given in a paper entitled "Air Charge Estimation in Camless Engines" by M. J. van Nieuwstadt, et al., published in *Society of Automotive Engineers World Congress and Exposition* SAE-2001-01-0581, March 2001, are effectively applied.

When IVC occurs after BDC, inertial and dynamic effects become significant. One such effect is that of the pressure wave resulting from the upward motion of the piston. This pressure wave does not reach the valves instantaneously. The result is that more air is in the cylinder at IVC than previously estimated. This is modeled as an effective advance of IVC.

$$\Delta IVC = \frac{x_{IVC}}{\sqrt{\gamma \cdot R \cdot T_{IVC}}} \cdot 6 \cdot N$$

where:
$x_{IVC}$ (m) is the distance from the piston to the top of the cylinder at IVC;
$\gamma$ is the ratio of specific heats, set equal to 1.4
R is the ideal gas constant and is equal to 287 J/kg K;

$T_{IVC}$ (K) is the temperature of the gas at IVC; and
N (rpm) is the engine speed.

The distance $x_{IVC}$ is determined from engine geometry $$x_{IVC} = L - (s_{IVC} - s_{min})$$

where:
L (m) is the stroke;
$S_{IVC}$ (m) is piston travel at IVC;
$S_{min}$ (m) is the minimum piston travel, which occurs at BDC.

Piston travel is calculated as follows:

$$s = \alpha \cdot \cos\theta + \sqrt{l^2 + \alpha^2 \sin^2\theta}$$

from Heywood referenced above, where:
α is crank radius, (m);
θ is crank angle, (deg.); and
l is connecting rod length (m).

Another effect is the restriction of flow from the cylinder to the intake and exhaust runners due to the relative size of the valve openings. This flow restriction causes a pressure change of $$\Delta P_{in} = \rho_{a,IVC} \cdot v_{IVC}^2 \cdot \left[\left(\frac{A_{run}}{A_p}\right)^2 - 1\right]$$

where:
$\rho_{a;IVC}$ is the density of air at IVC in (kg/m³);
$V_{IVC}$ is the piston velocity at IVC in (m/s);
$A_{run}$ is the runner area in (m²); and
$A_p$ is the piston area in (m²).

Piston velocity is calculated as follows:

$$v_{IVC} = 2 \cdot L \cdot N \cdot \frac{\pi}{2} \cdot \sin\theta_{IVC} \cdot \left(1 + \frac{\cos\theta_{IVC}}{\sqrt{S^2 - \sin^2\theta_{IVC}}}\right)$$

from Heywood referenced above, where:
L is stroke(m);
N is engine speed (rpm); and
$\theta_{IVC}$ is the crank angle (deg) at IVC.
S is defined as:

$$S = \frac{l}{a},$$

where:
l is the connecting rod length in meters; and
a is the crank radius in meters.

This pressure change results in an increase in density given by $$\rho_{in} = \rho_{a,IVC} \cdot \left(1 - \frac{\Delta P_{in}}{P_{amb}}\right).$$

The mass of air available for combustion, $m_a$ (kg), becomes $$m_a = f_{air} \cdot \rho_{in} \cdot V_m.$$

Figure 2:
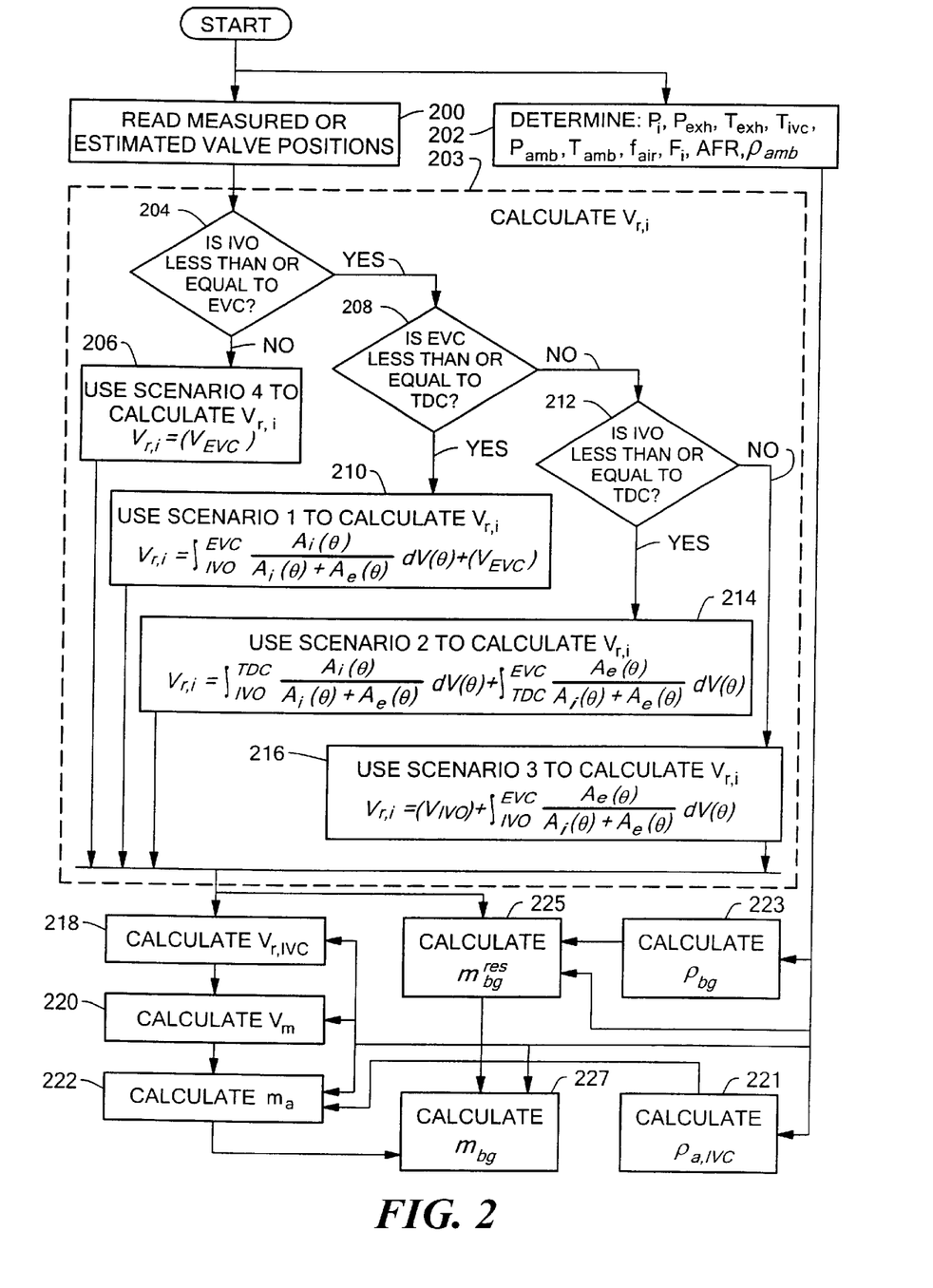
FIG. 2 is a flow diagram of a process used to determine cylinder charge for the engine system of FIG 1.

Referring now to FIG. 2, a flow diagram of the process used to determine cylinder air charge, $m_a$, is shown.

In Step 200, intake and exhaust valve positions are read or estimated. In Step 202, a determination is made of intake manifold pressure, $P_i$, exhaust gas pressure, $P_{exh}$, the temperature of the gas at IVC, $T_{IVC}$, exhaust gas temperature, $T_{exh}$, ambient pressure, $P_{amb}$, ambient temperature, $T_{amb}$, air-fuel ratio, AFR, and the density of air at ambient conditions, $P_{amb}$. $F_i$, $F_e$ and $f_{air}$ are also determined in Step 202, as described above. In Step 203 a calculation is made Of $V_{r,i}$. As noted above, the determination of $V_{r,i}$, is a calculation based on geometric expression. More particularly, there are four software modules stored in the ROM 34 of the controller 22. The four modules perform the calculations of $V_{r,i}$ for a corresponding one of the four scenarios described above. The particular scenario is a function of the geometrical relationships between, the opening and closing of the intake valve relative to the closing of the exhaust valve and to top dead center, TDC. More particularly, if IVO is not less than or equal to EVC, Step 204, the engine is in scenario 4 and the software mode 206 is used to calculate $V_{r,i}$ in accordance with:

$$V_{r,i} = V_{EVC};$$

If in step 204, it is determined that IVO is equal to or less than EVC, a determination is made in Step 208 as to whether EVC is less than or equal to TDC. If it is, the engine is in scenario 1 and the software module 210 is used to calculate $V_{r,i}$ in accordance with:

$$V_{r,i} = \int_{IVO}^{EVC} \frac{A_i(\theta)}{A_i(\theta) + A_e(\theta)} dV(\theta) + V_{EVC}.$$

If in Step 208, it is determined that EVC is not equal to or less than TDC, a determination is made in Step 212 as to whether IVO is less than or equal to TDC. If it is, the engine is in scenario 2 and the software module 214 is used to calculate $V_{r,i}$ in accordance with:

$$V_{r,i} = \int_{IVO}^{TDC} \frac{A_i(\theta)}{A_i(\theta) + A_e(\theta)} dV(\theta) + \int_{TDC}^{EVC} \frac{A_e(\theta)}{A_i(\theta) + A_e(\theta)} dV(\theta).$$

If in Step 212, it is determined that IVO is not equal to or less than TDC, the engine is in scenario 3 and the software module 216 is used to calculate $V_{r,i}$ in accordance with:

$$V_{r,i} = V_{IVO} + \int_{IVO}^{EVC} \frac{A_e(\theta)}{A_i(\theta) + A_e(\theta)} dV(\theta).$$

Having calculated $V_{r,i}$ using one of the four modules, 206, 210, 214 or 216, described above, controller 22 calculates $V_{r,IVC}$, in Step 218, as described above, from $V_{r,i}$, the intake manifold pressure, $P_i$, exhaust gas pressure, $P_{exh}$, the temperature of the gas at IVC, $T_{IVC}$, and exhaust gas temperature, $T_{exh}$, determined in Step 202. More particularly, $$V_{r,IVC} = \frac{T_{IVC}}{T_{exh}} \cdot \frac{P_{exh}}{P_i} \cdot (V_{r,i} + V_{el})$$

The controller 22 then calculates $V_m$, Step 220, as described above. More particularly, $$V_m = (V_{IVC} + V_{cl}) - F_e * V_{r,IVC}$$

where $F_e$ is provided via Step 202.

Next, the controller 22 calculates $\rho_{a,IVC}$ in Step 221 and then calculates $m_a$, in Step 222, as described above. More particularly, $$\rho_{a,IVC} = \rho_{amb} \cdot \frac{T_{amb}}{T_{IVC}} \cdot \frac{P_i}{P_{amb}}$$

and $$m_a = f_{air} \cdot \rho_{a,IVC} \cdot V_m$$

where:

$$f_{air} = \frac{m_a}{m_a + m_f + m_{bg}} = \frac{1}{1 + \frac{1}{AFR} + F_i}$$

where AFR and $F_i$ are provided in Step 202 and where inertial effects, described above, are here neglected.

Figure 2A:
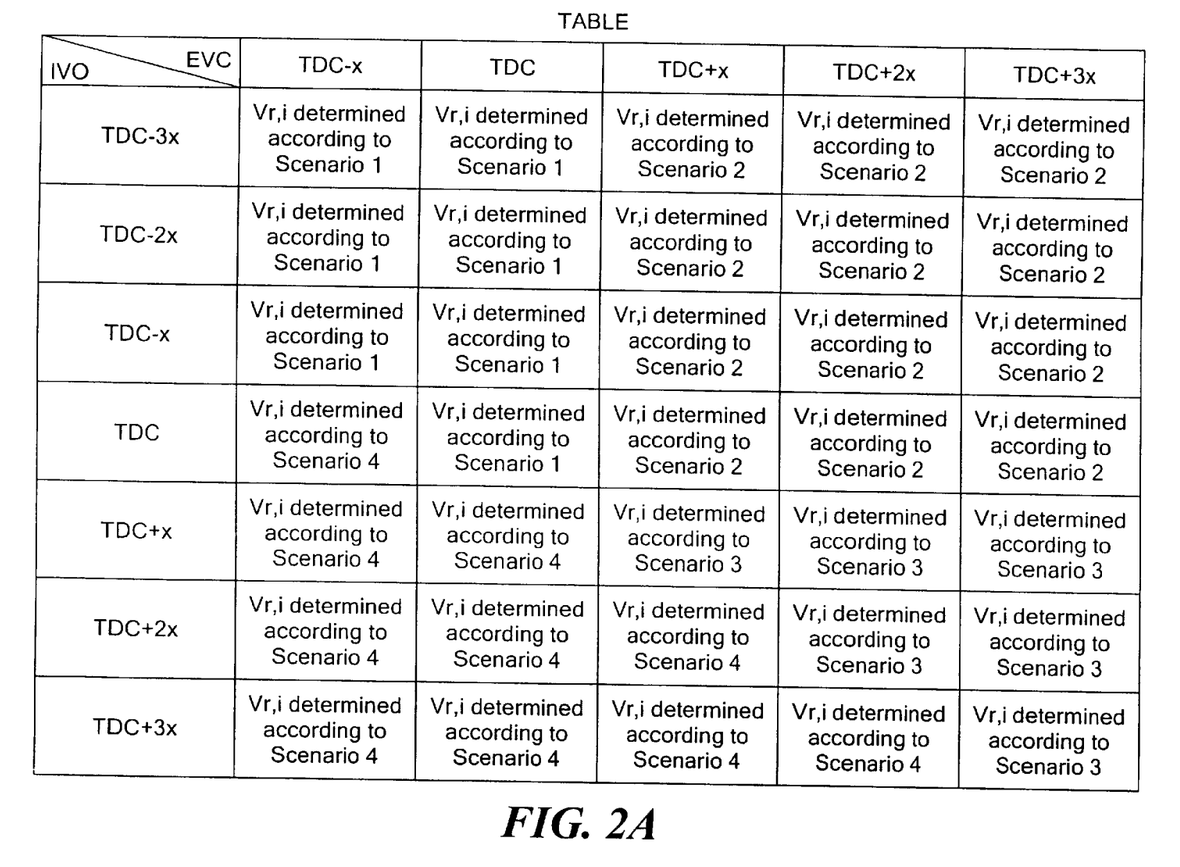
FIG. 2A is a table used to determine cylinder charge in accordance with an alternative embodiment of the invention.

Referring now to FIG. 2A, an embodiment is shown where a memory, for example ROM 36 (FIG. 1) stores a table. The memory stores a relationship between volume occupied by residual gas in the at least one cylinder at a predetermined position of the at least one cylinder in the engine during the cycle here, $V_{r,i}$, determined in accordance with each one of the plurality of scenarios for each of a plurality of different intake valve opening and exhaust valve closing conditions. The method determining from the memory, $V_{r,i}$ for the particular intake valve opening and exhaust valve closing condition. Then from the determined $V_{r,i}$, the cylinder air charge is determined. The table selects the one of the $V_{r,i}$ as determined from one of the four scenarios described above as a function of intake valve opening (IVO) and exhaust gas closing (EVC), relative to TDC and thus relative to each other. Thus, for example, if IVC is at TDC and EVC is TDC, $V_{r,i}$ is calculated from, according to the table shown in FIG. 2A, scenario 1. On the other hand, if EVC is less than TDC by an increment x (i.e., TDC−x) and IVO is greater than TDC by two increments, x, i.e., TDC+2x, $V_{r,i}$, is calculated from scenario 4. It should be understood that while the table is shown for equal increments, x, for both IVO and EVC, an equivalent table may be used with unequal increments for EVC and IVO relative to TDC.

CAM PROFILE SWITCHING (CPS)

Figure 1A:
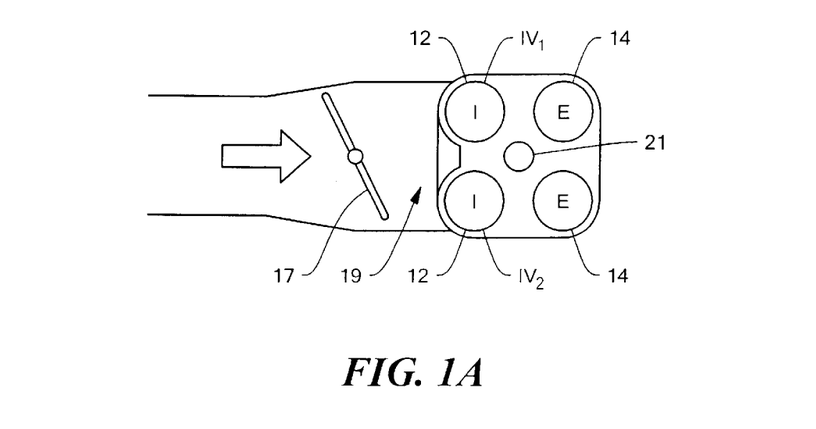
FIG. 1A is a diagram of the engine system of FIG. 1 having CPS.

Cam profile switching (CPS) is typically employed on engines with at least two intake valves and/or at least two exhaust valves. FIG. 1A, illustrates a configuration with two intake valves (I) (i.e., IV1, IV2) and two exhaust valves (E). When independent intake CPS is employed, the intake valves may not open and close at the same time, for some cam profiles. Similarly, with independent exhaust CPS, all of the exhaust valves may not open and close at the same time. The effects of independent CPS can be accounted for in the development of $V_{r,IVC}$. Here, in this example, the IVO1 is the intake valve that opens first, the IVO2 is the intake valve that opens second, (i.e., IVO2 is greater than or equal to IVO1); TDC is top dead center and is defined as 0 degrees CA; EVC is exhaust valve closing, here it is assumed that both exhaust valves close at the same time.

Figure 5:
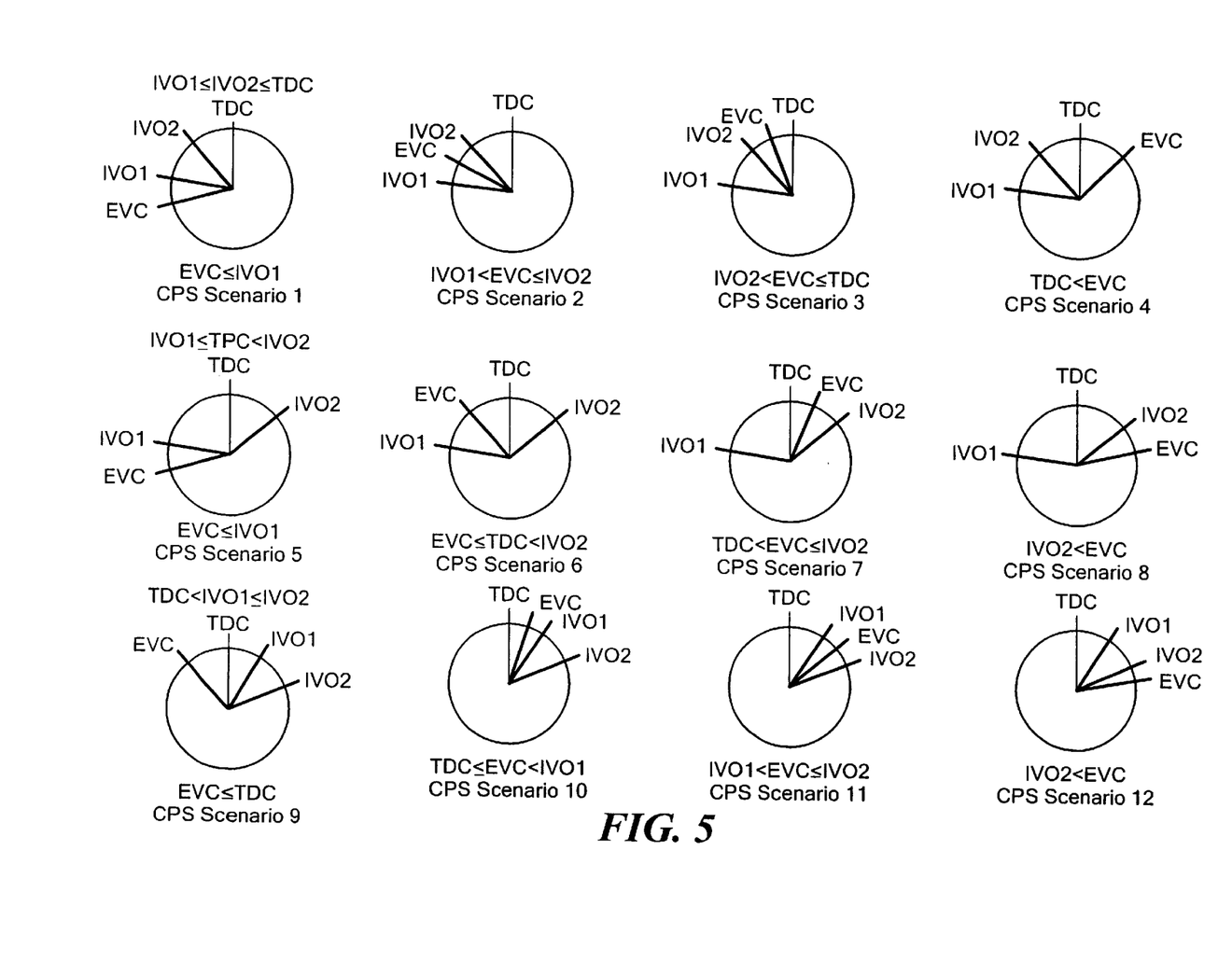
FIG. 5 are diagrams showing twelve engine scenarios for the CPS engine of FIG 1A, each one of the scenarios represent a particular spatial relationship between intake and exhaust valve open/closed positions for the engine system of FIG 1A relative to top dead center (TDC)

Algorithms for all 12 intake/exhaust valve combinations have been developed for independent intake valve CPS and are presented below:
where:
IVO1 is the crank angle at which the first intake valve opens;
IVO2 is the crank angle at which the second intake valve opens;
$A_1$ is the effective valve area of the intake valve that opens first; and
$A_2$ is the effective valve area of the intake valve that opens second.

The twelve scenarios are shown in FIG. 5:

CPS Scenario 1:

IVO1≦IVO2≦TDC AND EVC≦IVO1

CPS Scenario 2:

IVO1≦IVO2≦TDC AND IVO1<EVC≦IVO2

CPS Scenario 3:

IVO1≦IVO2≦TDC AND IVO2<EVC≦TDC

CPS Scenario 4:

IVO1≦IVO2≦TDC AND TDC<EVC

CPS Scenario 5:

IVO1≦TDC≦IVO2 AND EVC≦IVO1

CPS Scenario 6:

IVO1≦TDC<IVO2 AND EVC≦TDC<IVO2

CPS Scenario 7:

IVO1≦TDC<IVO2 AND TDC<EVC≦IVO2

CPS Scenario 8:

IVO1≦TDC<IVO2 AND IVO2<EVC

CPS Scenario 9:
 TDC<IVO1≦IVO2 AND EVC≦TDC
CPS Scenario 10:
 TDC<IVO1≦IVO2 AND TDC≦EVC≦IVO1
CPS Scenario 11:
 TDC<IVO1≦IVO2 AND IVO1<EVC≦IVO2
CPS Scenario 12:
 TDC<IVO1≦IVO2 AND IVO2<EVC
For CPS Scenarios 1, 5, 9, and 10:
 Calculate $V_{r,i}$ using a software module that calculates $V_{r,i}$ as follows:

$$V_{r,i} = V_{EVC}$$

where:
$V_{EVC}$ is the volume of residual gas remaining in the cylinder, expelled to the intake runner, or both.
For CPS Scenarios 2 and 6:
 Calculate $V_{r,i}$ using a software module that calculates $V_{r,i}$ as follows:

$$V_{r,i} = \int_{VOI}^{EVC} \frac{A_1(\theta)}{A_1(\theta) + 2 \cdot A_e(\theta)} dV(\theta) + V_{EVC}.$$

where:

$$\int_{VOI}^{EVC} \frac{A_1(\theta)}{A_1(\theta) + 2 \cdot A_e(\theta)} dV(\theta)$$

is the volume of residual gas expelled to the intake runner before the exhaust valves close; and $V_{EVC}$ is the volume of residual gas expelled to the intake runner after the exhaust valves close.

For CPS Scenario 3:
Calculate $V_{r,i}$ using a software module that calculates $V_{r,i}$ as follows:

$$V_{r,i} = \int_{IVO1}^{IVO2} \frac{A_1(\theta)}{A_1(\theta) + 2 \cdot A_e(\theta)} dV(\theta) + \int_{IVO2}^{EVC} \frac{A_1(\theta) + A_2(\theta)}{A_1(\theta) + A_2(\theta) + 2 \cdot A_e(\theta)} dV(\theta) + V_{EVC}.$$

where:

$$\int_{IVO1}^{IVO2} \frac{A_1(\theta)}{A_1(\theta) + 2 \cdot A_e(\theta)} dV(\theta)$$

is the volume of residual gas expelled to the intake runner before the second intake valve opens;

$$\int_{IVO2}^{EVC} \frac{A_1(\theta) + A_2(\theta)}{A_1(\theta) + A_2(\theta) + 2 \cdot A_e(\theta)} dV(\theta)$$

is the volume of residual gas expelled to the intake runners after both intake valves are open (prior to EVC); and $V_{EVC}$ is the volume of residual gas expelled to the intake runners after the exhaust valves close.

For CPS Scenario 4:
Calculate $V_{r,i}$ using a software module that calculates $V_{r,i}$ as follows:

$$V_{r,i} = \int_{IVO1}^{IVO2} \frac{A_1(\theta)}{A_1(\theta) + 2 \cdot A_e(\theta)} dV(\theta) + \int_{IVO2}^{TDC} \frac{A_1(\theta) + A_2(\theta)}{A_1(\theta) + A_2(\theta) + 2 \cdot A_e(\theta)} dV(\theta) + \int_{TDC}^{EVC} \frac{2 \cdot A_2(\theta)}{A_1(\theta) + A_2(\theta) + 2 \cdot A_e(\theta)} dV(\theta)$$

where:

$$\int_{IVO1}^{IVO2} \frac{A_1(\theta)}{A_1(\theta) + 2 \cdot A_e(\theta)} dV(\theta)$$

is the volume of residual gas expelled to the intake runner before the second intake valve opens;

$$\int_{IVO2}^{TDC} \frac{A_1(\theta) + A_2(\theta)}{A_1(\theta) + A_2(\theta) + 2 \cdot A_e(\theta)} dV(\theta)$$

is the volume of residual gas expelled to the intake runners after both intake valves open; and $$\int_{TDC}^{EVC} \frac{2 \cdot A_e(\theta)}{A_1(\theta) + A_2(\theta) + 2 \cdot A_e(\theta)} dV(\theta)$$

is the volume of residual gas pulled from the exhaust runners.

For CPS Scenario 7:
Calculate $V_{r,i}$ using a software module that calculates $V_{r,i}$ as follows:

$$V_{r,i} = \int_{IVO1}^{TDC} \frac{A_1(\theta)}{A_1(\theta) + 2 \cdot A_e(\theta)} dV(\theta) + \int_{TDC}^{EVC} \frac{2 \cdot A_e(\theta)}{A_1(\theta) + 2 \cdot A_e(\theta)} dV(\theta)$$

where:

$$\int_{IVO1}^{TDC} \frac{A_1(\theta)}{A_1(\theta) + 2 \cdot A_e(\theta)} dV(\theta)$$

is the volume of residual gas expelled to the intake runner; and $$\int_{TDC}^{EVC} \frac{2 \cdot A_e(\theta)}{A_1(\theta) + 2 \cdot A_e(\theta)} dV(\theta)$$

is the volume of residual gas pulled from the exhaust runners.

For CPS Scenario 8:
Calculate $V_{r,i}$ using a software module that calculates $V_{r,i}$ as follows:

$$V_{r,i} = \int_{IVO1}^{TDC} \frac{A_1(\theta)}{A_1(\theta) + 2 \cdot A_e(\theta)} dV(\theta) + \int_{TDC}^{IVO2} \frac{2 \cdot A_e(\theta)}{A_1(\theta) + 2 \cdot A_e(\theta)} dV(\theta) + \int_{IVO2}^{EVC} \frac{2 \cdot A_e(\theta)}{A_1(\theta) + A_2(\theta) + 2 \cdot A_e(\theta)} dV(\theta)$$

where:

$$\int_{IVO1}^{TDC} \frac{A_1(\theta)}{A_1(\theta) + 2 \cdot A_e(\theta)} dV(\theta)$$

is the volume of residual gas expelled to the intake runner;

$$\int_{TDC}^{IVO2} \frac{2 \cdot A_e(\theta)}{A_1(\theta) + 2 \cdot A_e(\theta)} dV(\theta)$$

is the volume of residual gas pulled from the exhaust runners before the second intake valve opens; and $$\int_{IVO2}^{EVC} \frac{2 \cdot A_e(\theta)}{A_1(\theta) + A_2(\theta) + 2 \cdot A_e(\theta)} dV(\theta)$$

is the volume of residual gas pulled from the exhaust runners after the second valve opens.

For CPS Scenario 11
Calculate $V_{r,i}$ using a software module that calculates $V_{r,i}$ as follows:

$$V_{r,i} = V_{IVO1} + \int_{IVO1}^{EVC} \frac{2 \cdot A_e(\theta)}{A_1(\theta) + 2 \cdot A_e(\theta)} dV(\theta)$$

where:

$V_{IVO1}$ is the volume of residual gas pulled from the exhaust runners before the first intake valve opens; and $$\int_{IVO1}^{EVC} \frac{2 \cdot A_e(\theta)}{A_1(\theta) + 2 \cdot A_e(\theta)} dV(\theta)$$

is the volume of residual gas pulled from the exhaust runners after the first intake valve opens.

For CPS Scenario 12:
Calculate $V_{r,i}$ using a software module that calculates $V_{r,i}$ as follows:

$$V_{r,i} = V_{IVO1} + \int_{IVO1}^{IVO2} \frac{2 \cdot A_e(\theta)}{A_1(\theta) + 2 \cdot A_e(\theta)} dV(\theta) +$$

$$\int_{IVO2}^{EVC} \frac{2 \cdot A_e(\theta)}{A_1(\theta) + A_2(\theta) + 2 \cdot A_e(\theta)} dV(\theta)$$

where:

$V_{IVO1}$ is the volume of residual gas pulled from the exhaust runners before the first intake valve opens;

$$\int_{IVO1}^{IVO2} \frac{2 \cdot A_e(\theta)}{A_1(\theta) + 2 \cdot A_e(\theta)} dV(\theta)$$

is the volume of residual gas pulled from the exhaust runners after the first intake valve opens and before the second valve opens; and $$\int_{IVO2}^{EVC} \frac{2 \cdot A_e(\theta)}{A_1(\theta) + A_2(\theta) + 2 \cdot A_e(\theta)} dV(\theta)$$

is the volume of residual gas pulled from the exhaust runners after the second valve opens.

Figure 6:
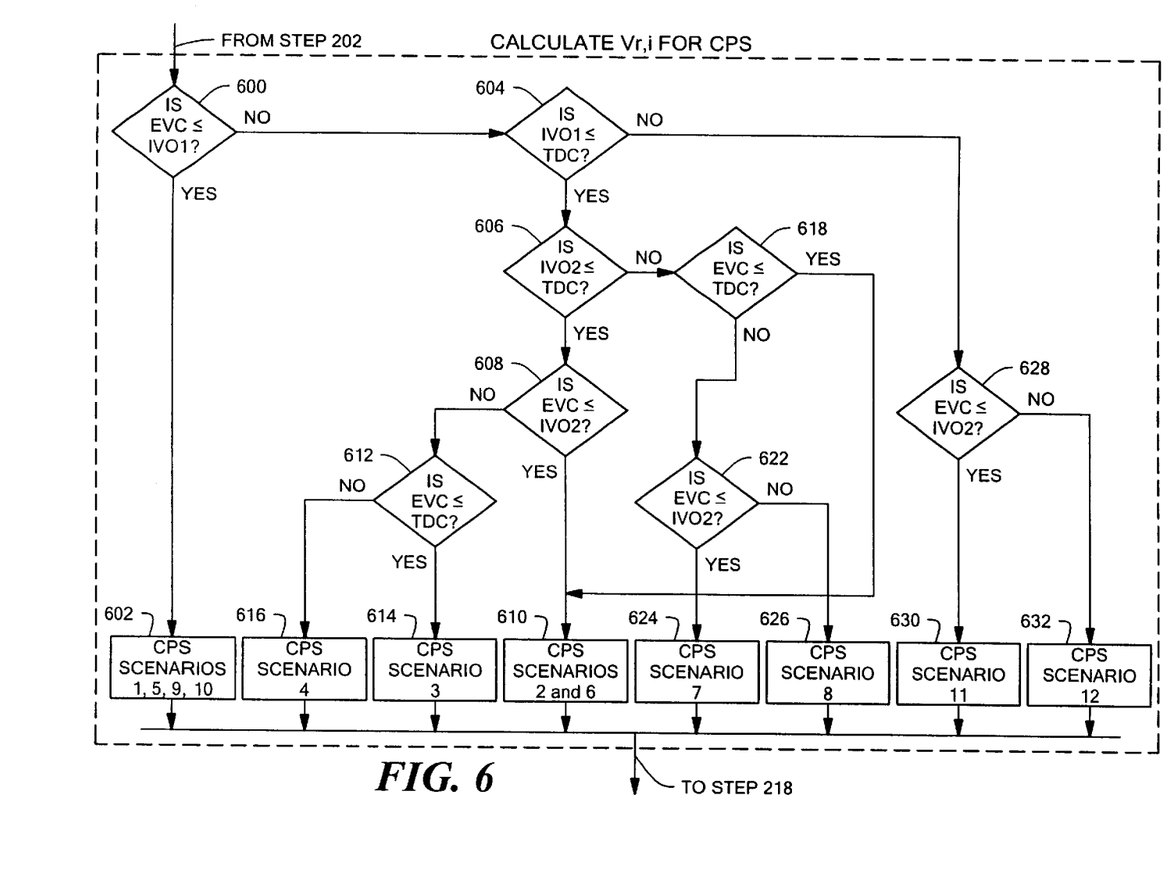
FIG. 6 is a flow diagram of a process used to determine cylinder charge for the CPS engine system of FIG 1A.

Referring now to FIG. 6, the Step $203_{CPS}$ is used in place of Step 203 (FIG. 2), is used to calculate $V_{r,i}$ using one of the software modules presented above.

Thus, after Step 202, FIG. 2, a determination is made in Step 600 as to whether EVC is less than or equal to IVO1. If it is, the engine is in CPS scenarios 1, 5, 9 or 10 and software module 602 is used to calculate $V_{r,i}$ as:

$$V_{r,i} = V_{EVC}.$$

If, on the other hand, in Step 600, it is determined that EVC is not equal to or less than or equal to IVO1, a determination is made in Step 604 as to whether IVO1 is less than or equal to TDC. If it is, a determination is made in Step 606 as to whether IVO2 is less than or equal to TDC. If it is, a determination is made in Step 608 as to whether EVC is less than or equal to IVO2. If it is, the engine is in CPS scenario 2 and module 610 is used to calculate $V_{r,i}$ as:

$$V_{r,i} = \int_{IVO1}^{EVC} \frac{A_1(\theta)}{A_1(\theta) + 2 \cdot A_e(\theta)} dV(\theta) + V_{EVC}.$$

If, in Step 608, it is determined that EVC is not less than or equal to IVO2, a determination is made in Step 612 as to whether EVC is less than or equal to TDC. If it is, the engine is in CPS scenario 3 and module 614 is used to calculate $V_{r,i}$ as:

$$V_{r,i} = \int_{IVO1}^{IVO2} \frac{A_1(\theta)}{A_1(\theta) + 2 \cdot A_e(\theta)} dV(\theta) +$$

$$\int_{IVO2}^{EVC} \frac{A_1(\theta) + A_2(\theta)}{A_1(\theta) + A_2(\theta) + 2 \cdot A_e(\theta)} dV(\theta) + V_{EVC}.$$

If, in Step 612, it is determined that EVC is not equal to or less than TDC, the engine is in CPS scenario 4 and module 616 is used to calculate $V_{r,i}$ as:

$$V_{r,i} =$$

$$\int_{IVO1}^{IVO2} \frac{A_1(\theta)}{A_1(\theta) + 2 \cdot A_e(\theta)} dV(\theta) + \int_{IVO2}^{TDC} \frac{A_1(\theta) + A_2(\theta)}{A_1(\theta) + A_2(\theta) + 2 \cdot A_e(\theta)} dV(\theta) +$$

$$\int_{TDC}^{EVC} \frac{2 \cdot A_e(\theta)}{A_1(\theta) + A_2(\theta) + 2 \cdot A_e(\theta)} dV(\theta).$$

If, in Step 606, it is determined that IVO2 was not equal to or less than TDC, a determination is made in Step 618 as to whether EVC is less than or equal to TDC. If it is, the engine is in CPS scenario 6 and module 610 is used to calculate $V_{r,i}$ as:

$$V_{r,i} = \int_{IVO1}^{EVC} \frac{A_1(\theta)}{A_1(\theta) + 2 \cdot A_e(\theta)} dV(\theta) + V_{EVC}.$$

If, in Step 618, it is determined that EVC is not equal to or less than TDC, a determination is made in Step 622 as to whether EVC is less than or equal to IVO2. If it is, the engine is in CPS scenario 7 and module 624 is used to calculate $V_{r,i}$ as:

$$V_{r,i} = \int_{IVO1}^{TDC} \frac{A_1(\theta)}{A_1(\theta) + 2 \cdot A_e(\theta)} dV(\theta) + \int_{TDC}^{EVC} \frac{2 \cdot A_e(\theta)}{A_1(\theta) + 2 \cdot A_e(\theta)} dV(\theta).$$

If, in Step 622, it is determined that EVC is not less than or equal to IVO2, the engine is in CPS scenario 8 and module 626 is used to calculate $V_{r,i}$ as:

$$V_{r,i} = \int_{IVO1}^{TDC} \frac{A_1(\theta)}{A_1(\theta) + 2 \cdot A_e(\theta)} dV(\theta) +$$

$$\int_{TDC}^{IVO2} \frac{2 \cdot A_e(\theta)}{A_1(\theta) + 2 \cdot A_e(\theta)} dV(\theta) + \int_{IVO2}^{EVC} \frac{2 \cdot A_e(\theta)}{A_1(\theta) + A_2(\theta) + 2 \cdot A_e(\theta)} dV(\theta).$$

If, in Step 604, it is determined that IVO1 is not less than or equal to TDC, a determination is made in Step 628 as to whether EVC is less than or equal to IVO2. If it is, the engine is in CPS scenario 11 and module 630 is used to calculate $V_{r,i}$ as:

$$V_{r,i} = V_{IVO1} + \int_{IVO1}^{EVC} \frac{2 \cdot A_e(\theta)}{A_1(\theta) + 2 \cdot A_e(\theta)} dV(\theta).$$

If, in Step 628, it is determined that EVC is not less than or equal to IVO2, the engine is in CPS scenario 12 and module 632 is used to calculate $V_{r,i}$ as:

$$V_{r,i} = V_{IVOI} + \int_{IVOI}^{IVO2} \frac{2 \cdot A_e(\theta)}{A_1(\theta) + 2 \cdot A_e(\theta)} dV(\theta) +$$
$$\int_{IVO2}^{EVC} \frac{2 \cdot A_e(\theta)}{A_1(\theta) + A_2(\theta) + 2 \cdot A_e(\theta)} dV(\theta).$$

Regression Based Modeling

For cases when a strictly geometric approach doesn't provide the accuracy needed, the geometric terms can be employed to produce a simpler, perhaps more accurate regression based estimate. For example, airflow may be modeled as follows $$\dot{m}_a = f\left(N, P_i, V_m, V_{r,IVC}, \frac{T_{IVC}}{T_{exh}}\right).$$

Burned Gas Estimation

The expressions described in the previous sections can also be used to estimate the quantity of burned gas in the cylinder, which can subsequently be used in models of MBT spark, NOx emissions, etc. That is, once $V_{r,i}$ is determined as described above in connection with either FIGS. 2 or 2A or for CPS from FIG. 6 or a table equivalent to the table in FIG. 2A, the quantity of burned gas contained in the residual, $m_{bg}^{res}$, may be determined in accordance with.

$$m_{bg}^{res} = F_e \cdot (V_{r,i} + V_{cl}) \cdot \rho_{bg}$$

$$\rho_{bg} = \rho_{amb} \cdot \frac{T_{amb}}{T_{exh}} \cdot \frac{P_{exh}}{P_{amb}} \cdot \frac{M_{bg}}{M_m}$$

where:
$\rho_{bg}$ is the density of the burned gas;
$M_{bg}$ is the molar mass of the residual gas;
$M_m$ is the molar mass of mixture; and
$F_e$ is the fraction of burned gas in the residual gas This in addition to the burned gas introduced through external EGR, $m_{bg}^i$, results in an estimate of the total quantity of burned gas in the cylinder, $m_{bg}$.

$$m_{bg} = m_{bg}^{res} + m_{bg}^i$$

where $m_{bg}^i$ is determined from the definition of $F_i$ defined above:

$$m_{bg}^i = F_i \cdot m_a.$$

Thus, for example, referring to FIG. 2, if one desired an estimation of burned gas, $m_{bg}$, a calculation is made of calculation of $\rho_{bg}$ in accordance with $$\rho_{bg} = \rho_{amb} \cdot \frac{T_{amb}}{T_{exh}} \cdot \frac{P_{exh}}{P_{amb}} \cdot \frac{M_{bg}}{M_m}$$

in Step 223, and then in Step 225, $m_{bg}^{res}$ is calculated in accordance with $m_{bg}^{res} = F_e \cdot (V_{r,i} + V_{cl}) \cdot \rho_{bg}$. Finally, in Step 227, $m_{bg}$ is calculated in accordance with $m_{bg} = m_{bg}^{res} + m_{bg}^i$.

Thus, having calculated $V_{r,i}$ in Step 203 in FIG. 2 or Step $203_{CPS}$ in FIG. 6, a determination may be made of either cylinder air charge, $m_a$, or cylinder burned gas, $m_{bg}$, or both cylinder air charge, $m_a$, and cylinder burned gas, $m_{bg}$ (i.e., a determination of at least one of cylinder air charge and cylinder burned gas)

A number of embodiments of the invention have been described. Nevertheless, it will be understood that various modifications may be made without departing from the spirit and scope of the invention. For example, from the foregoing, extension to independent exhaust CPS is straightforward.

Accordingly, other embodiments are within the scope of the following claims.

What is claimed is:

1. A method for determining at least one of cylinder air charge and cylinder burned gas for an internal combustion engine system, such engine system including cylinders, each one of such cylinders having at least one intake valve and at least one exhaust valve in communication with such cylinder, such method comprising:
   determining one of a plurality of different scenarios, each one of the scenarios representing a geometrical relationship between opening and closing of the intake valve relative to closing of the exhaust valve; calculating the at least one of the cylinder air charge and cylinder burned gas in accordance with the determined one of the plurality of scenarios; and
   wherein the engine system includes a memory, such memory storing a plurality of different software modules, and wherein the method includes:
   selecting one of the plurality of software modules in accordance with the determined one of the plurality of scenarios; and
   wherein the calculating of the at least one of the cylinder air charge and cylinder burned gas comprises executing the selected one of the modules.

2. A method for determining at least one of cylinder air charge and cylinder burned gas for an internal combustion engine system, such engine system including cylinders, each one of such cylinders having at least one intake valve and at least one exhaust valve in communication with such cylinder, such method comprising:
   determining one of a plurality of different scenarios, each one of the scenarios representing a geometrical relationship between opening and closing of the intake valve relative to closing of the exhaust valve; calculating the at least one of the cylinder air charge and cylinder burned gas in accordance with the determined one of the plurality of scenarios; and
   including:
   storing in a memory a relationship between volume occupied by residual gas in the at least one cylinders at a predetermined position of the at least one cylinder in the engine during the cycle determined in accordance with each one of the plurality of scenarios for each of a plurality of different intake valve opening and exhaust valve closing conditions;
   determining from the memory the volume occupied by residual gas in the at least one cylinders at a predetermined position of the at least one cylinder in the engine during the cycle for the intake valve opening and exhaust valve closing conditions; and,
   determining from volume occupied by residual gas in the at least one cylinders at a
   predetermined position of the at least one cylinder in the engine during the cycle the
   at least one of the cylinder air charge and cylinder burned gas.

3. A computer readable storage medium having stored data representing instructions executable by a computer to determine at least one of cylinder air charge and cylinder burned gas for an internal combustion engine system, such engine system including cylinders, each one of such cylinders having at least one intake valve and at least one exhaust valve in communication with such cylinder, comprising:

instructions for determining one of a plurality of different scenarios, each one of the scenarios representing a geometrical relationship between opening and closing of the intake valve relative to closing of the exhaust valve;

instructions for calculating the at least one of the cylinder air charge and cylinder burned gas in accordance with the determined one of the plurality of scenarios; and wherein the engine system includes a memory, such memory storing a plurality of different software modules, and wherein the storage medium comprises:

instructions for selecting one of the plurality of software modules in accordance with the determined one of the plurality of scenarios; and wherein the instructions for calculating of the at least one of the cylinder air charge and cylinder burned gas comprises instructions for executing the selected one of the modules.

4. A computer readable storage medium having stored data representing instructions executable by a computer to determine at least one of cylinder air charge and cylinder burned gas for an internal combustion engine system, such engine system including cylinders, each one of such cylinders having at least one intake valve and at least one exhaust valve in communication with such cylinder, comprising:

instructions for determining one of a plurality of different scenarios, each one of the scenarios representing a geometrical relationship between opening and closing of the intake valve relative to closing of the exhaust valve;

instructions for calculating the at least one of the cylinder air charge and cylinder burned gas in accordance with the determined one of the plurality of scenarios; and wherein the engine system includes a memory for storing a relationship between volume occupied by residual gas in the at least one cylinders at a predetermined position of the at least one cylinder in the engine during the cycle determined in accordance with each one of the plurality of scenarios for each of a plurality of different intake valve opening and exhaust valve closing conditions and wherein the medium comprises:

instructions for determining from the memory the volume occupied by residual gas in the at least one cylinders at a predetermined position of the at least one cylinder in the engine during the cycle for the intake valve opening and exhaust valve closing conditions; and, instructions for determining from volume occupied by residual gas in the at least one cylinders at a predetermined position of the at least one cylinder in the engine during the cycle the at least one of the cylinder air charge and cylinder burned gas.

\* \* \* \* \*

UNITED STATES PATENT AND TRADEMARK OFFICE
CERTIFICATE OF CORRECTION

PATENT NO. : 6,850,831 B1
DATED : February 1, 2005
INVENTOR(S) : Buckland, Kolmanovsky, Sun and Scillieri It is certified that error appears in the above-identified patent and that said Letters Patent is hereby corrected as shown below:

<u>Title page,</u>
Item [75], Inventors, should read: -- Buckland; Julia Helen (Dearborn, MI); Kolmanovsky; Ilya V. (Ypsilanti, MI); Sun; Jing (Bloomfield, MI); Scillieri; Joseph (Ann Arbor, MI); Van Nieuwstadt, Michiel (Ann Arbor, MI) --.

Signed and Sealed this

Eighteenth Day of October, 2005

JON W. DUDAS
*Director of the United States Patent and Trademark Office*